US011822935B2

(12) United States Patent
Zhang et al.

(10) Patent No.: US 11,822,935 B2
(45) Date of Patent: Nov. 21, 2023

(54) PROCESSING METHOD AND APPARATUS OF DEVICE STATUS CHANGE AND NON-TRANSITORY COMPUTER-READABLE STORAGE MEDIUM

(71) Applicant: BOE TECHNOLOGY GROUP CO., LTD., Beijing (CN)

(72) Inventors: Zhe Zhang, Beijing (CN); Yingjie Li, Beijing (CN); Naifu Wu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 287 days.

(21) Appl. No.: 17/433,666

(22) PCT Filed: Apr. 9, 2021

(86) PCT No.: PCT/CN2021/086126
§ 371 (c)(1),
(2) Date: Aug. 25, 2021

(87) PCT Pub. No.: WO2021/232992
PCT Pub. Date: Nov. 25, 2021

(65) Prior Publication Data
US 2022/0342677 A1 Oct. 27, 2022

(30) Foreign Application Priority Data
May 22, 2020 (CN) .......................... 202010443798.2

(51) Int. Cl.
G06F 9/00 (2006.01)
G06F 9/445 (2018.01)
G06F 9/451 (2018.01)

(52) U.S. Cl.
CPC .......... *G06F 9/44505* (2013.01); *G06F 9/451* (2018.02)

(58) Field of Classification Search
None
See application file for complete search history.

(56) References Cited

U.S. PATENT DOCUMENTS 9,838,270 B2 * 12/2017 Nagashima ............. H04L 41/50
2007/0067373 A1 * 3/2007 Higgins ................. G06Q 30/00
2013/0246936 A1    9/2013 Nancke-Krogh

FOREIGN PATENT DOCUMENTS

CN    101510091 A    8/2009
CN    103810028 A    5/2014

(Continued)

Primary Examiner — Nitin C Patel
(74) Attorney, Agent, or Firm — The Webb Law Firm

(57) ABSTRACT

The present disclosure provides a processing apparatus of device status change, including processor configured to: in response to detecting one or more status changes of at least one device, judging whether each status change would cause an update conflict of status information corresponding to the each status change, in a management user interface of the at least one device; store a management user interface update task corresponding to a status change that would not cause the update conflict into a current execution queue, and store a management user interface update task corresponding to a status change that would cause the update conflict into a delayed execution queue; and in the case where the update conflict corresponding to the management user interface update task in the delayed execution queue has ended, execute the management user interface update task corresponding to the update conflict in the delayed execution queue.

19 Claims, 3 Drawing Sheets

(56) References Cited

FOREIGN PATENT DOCUMENTS

| CN | 104678769 A | 6/2015 |
| CN | 107729127 A | 2/2018 |
| CN | 109213424 A | 1/2019 |
| CN | 109976920 A | 7/2019 |
| CN | 111124566 A | 5/2020 |
| CN | 111611042 A | 9/2020 |

\* cited by examiner

PROCESSING METHOD AND APPARATUS OF DEVICE STATUS CHANGE AND NON-TRANSITORY COMPUTER-READABLE STORAGE MEDIUM

CROSS-REFERENCE TO RELATED APPLICATIONS

This application is a U.S. National Stage Application under 35 U.S.C. § 371 of International Patent Application No. PCT/CN2021/086126, filed on Apr. 9, 2021, which is based on and claims the priority to the Chinese patent application No. 202010443798.2 filed on May 22, 2020, the disclosure of both of which are hereby incorporated by reference in their entirety into the present application.

TECHNICAL FIELD

The present disclosure relates to the field of computer technologies, and particularly, to a processing method of device status change, a processing apparatus of device status change, and a non-transitory computer-readable storage medium.

BACKGROUND

With the development of the internet of things technology, centralized management of various devices can be realized. For example, smart home can connect various devices in a home together through the internet of things technology to provide various functions. A user can operate the various devices through a management UI (User Interface) of an intelligent terminal, and monitor device status. Therefore, it is very important to update status of the devices in the management UI timely and accurately.

In the related art, the status of the devices in the management UI are updated in response to the user's operation in the management UI and the detection of device status change.

SUMMARY

According to some embodiments of the present disclosure, there is provided a processing apparatus of device status change, which is executed by an electronic device, comprising one or more processors configured to: in response to detecting one or more status changes of at least one device, judge whether each status change would cause an update conflict of status information corresponding to the each status change in a management user interface of the at least one device; store a management user interface update task corresponding to a status change that would not cause the update conflict into a current execution queue, and store a management user interface update task corresponding to a status change that would cause the update conflict into a delayed execution queue; and in the case where the update conflict corresponding to the management user interface update task in the delayed execution queue has ended, execute the management user interface update task corresponding to the update conflict in the delayed execution queue.

In some embodiments, the executing the UI update task in the delayed execution queue comprises: executing the UI update task in the delayed execution queue after the UI update task in the current execution queue has been executed.

In some embodiments, it is judged that the status change would cause the update conflict in the case where at least one of the following conditions is met: an update of status information caused by a status change conflicting with an update of status information caused by an interaction operation received by the management user interface; or the number of devices with status change being greater than a threshold.

In some embodiments, the executing the UI update task in the delayed execution queue comprises: retrieving a management user interface update task corresponding to a latest status change in the delayed execution queue, and executing it as a target task; judging whether device and status type corresponding to other management user interface update task in the delayed execution queue are the same as device and status type corresponding to the target task; removing a management user interface update task with the same device and status type as the target task from the delayed execution queue; and repeatedly executing above steps until no management user interface update task remains in the delayed execution queue.

In some embodiments, the processor is further configured to: store the status changes corresponding to the management UI update tasks in the current execution queue and the delayed execution queue as historical status change information of the device corresponding to the status change, for status information recalling.

In some embodiments, the storing a status change corresponding to the management user interface update tasks in the current execution queue and the delayed execution queue as historical status change information of device corresponding to the status change comprises: creating a status aggregation class containing at least one device status class corresponding to the at least one device, the device status class containing a status list for storing the each status change and device operation corresponding to the each status change; and storing status change corresponding to each management user interface update task in the current execution queue and the delayed execution queue, as the historical status change information of the device corresponding to the status change, in the status list corresponding to the device.

In some embodiments, the executing the management UI update task in the delayed execution queue comprises: after a certain UI update task in the delayed execution queue has been retrieved and executed, in response to a new status change causing the update conflict during the execution of the UI update task, storing the UI update task corresponding to the new status change into the delayed execution queue; and preferentially executing the UI update task corresponding to the new status change.

In some embodiments, the status change is detected by at least one of the following: detecting the status change in response to a control apparatus sending a control command to the device; detecting the status change in response to at least one of a monitoring environment or monitoring condition of the device changing, the device being a sensor; or detecting the status change in response to the control apparatus synchronizing the status information of the device.

In some embodiments, the storing a UI update task corresponding to a status change that would not cause the update conflict into a current execution queue, and storing a UI update task corresponding to a status change that would cause the update conflict into a delayed execution queue comprises: storing the UI update task corresponding to the status change that would not cause the update conflict into the current execution queue of a buffer pool; and after a delayed update identifier has been added to the UI update task corresponding to the status change that would cause the update conflict, storing the UI update task into the delayed execution queue of the buffer pool.

In some embodiments, the storing a management user interface update task corresponding to a status change that would not cause an update conflict into a current execution queue, and storing a management user interface update task corresponding to a status change that would cause an update conflict into a delayed execution queue comprises: storing the management user interface update task corresponding to the status change that would not cause the update conflict into the current execution queue of a buffer pool; and storing the management user interface update task corresponding to the status change that would cause the update conflict into the delayed execution queue of the buffer pool.

In some embodiments, the executing the management user interface update task corresponding to the update conflict in the delayed execution queue comprises: in the case where the update conflict corresponding to the management user interface update task in the delayed execution queue has ended, adding a data update identifier to the management user interface update task corresponding to the update conflict in the delayed execution queue; and sending a data update request according to the data update identifier, to update the status of the device corresponding to the management user interface update task corresponding to the update conflict, and executing the management user interface update task corresponding to the update conflict.

According to other embodiments of the present disclosure, there is provided a processing method of device status change, comprising: in response to detecting one or more status changes of at least one device, judging whether each status change would cause an update conflict of status information corresponding to the each status change, in a management user interface of the at least one device; storing a management user interface update task corresponding to a status change that would not cause the update conflict into a current execution queue, and storing a management user interface update task corresponding to a status change that would cause the update conflict into a delayed execution queue; and in the case where the update conflict corresponding to the management user interface update task in the delayed execution queue has ended, executing the management user interface update task corresponding to the update conflict in the delayed execution queue.

In some embodiments, the executing the management UI update task in the delayed execution queue comprises: executing the UI update task in the delayed execution queue after the UI update task in the current execution queue has been executed.

In some embodiments, it is judged that the status change would cause the update conflict in the case where at least one of the following conditions is met: determining the status change would cause the update conflict in the case where at least one of following conditions is met: an update of status information caused by a status change conflicting with an update of status information caused by an interaction operation received by the management user interface; or the number of devices with status change being greater than a threshold.

In some embodiments, the executing the UI update task in the delayed execution queue comprises: retrieving a management user interface update task corresponding to a latest status change in the delayed execution queue, and executing it as a target task; judging whether device and status type corresponding to other management user interface update task in the delayed execution queue are the same as device and status type corresponding to the target task; removing a management user interface update task with the same device and status type as the target task from the delayed execution queue; and repeatedly executing above steps until no management user interface update task remains in the delayed execution queue.

In some embodiments, the processing method further comprises: storing a status change corresponding to the management user interface update tasks in the current execution queue and the delayed execution queue as historical status change information of a device corresponding to the status change, for status information recalling.

In some embodiments, the storing a status change corresponding to the management user interface update tasks in the current execution queue and the delayed execution queue as historical status change information of device corresponding to the status change comprises: creating a status aggregation class containing at least one device status class corresponding to the at least one device, the device status class containing a status list for storing the each status change and device operation corresponding to the each status change; and storing status change corresponding to each management user interface update task in the current execution queue and the delayed execution queue, as the historical status change information of the device corresponding to the status change, in the status list corresponding to the device.

In some embodiments, the executing the UI update task in the delayed execution queue comprises: after a certain UI update task in the delayed execution queue has been retrieved and executed, in response to a new status change causing the update conflict during the execution of the UI update task, storing a UI update task corresponding to the new status change into the delayed execution queue; and preferentially executing the UI update task corresponding to the new status change.

In some embodiments, the status change is detected by at least one of the following: detecting the status change in response to a control apparatus sending a control command to the at least one device; detecting the status change in response to that the device is a sensor and at least one of a monitoring environment or a monitoring condition of the sensor changes; or detecting the status change in response to the control apparatus synchronizing the status information of the at least one device.

In some embodiments, the storing a management user interface update task corresponding to a status change that would not cause an update conflict into a current execution queue, and storing a management user interface update task corresponding to a status change that would cause an update conflict into a delayed execution queue comprises: storing the management user interface update task corresponding to the status change that would not cause the update conflict into the current execution queue of a buffer pool; and storing the management user interface update task corresponding to the status change that would cause the update conflict into the delayed execution queue of the buffer pool.

In some embodiments, the executing the management user interface update task corresponding to the update conflict in the delayed execution queue comprises: in the case where the update conflict corresponding to the management user interface update task in the delayed execution queue has ended, adding a data update identifier to the management user interface update task corresponding to the update conflict in the delayed execution queue; and sending a data update request according to the data update identifier, to update the status of the device corresponding to the management user interface update task corresponding to the update conflict, and executing the management user interface update task corresponding to the update conflict.

According to still other embodiments of the present disclosure, there is provided a processing apparatus of device status change, comprising: a judgment unit configured to judge, in response to detecting one or more status changes of at least one device, whether each status change would cause an update conflict of status information corresponding to the each status change, in a management user interface of the at least one device; a storage unit configured to store a UI update task corresponding to a status change that would not cause the update conflict into a current execution queue, and store a UI update task corresponding to a status change that would cause the update conflict into a delayed execution queue; and an execution unit configured to execute, in the case where the update conflict corresponding to the UI update task in the delayed execution queue has ended, the UI update task in the delayed execution queue.

In some embodiments, the execution unit executes, after having executed the UI update task in the current execution queue, the UI update task in the delayed execution queue.

In some embodiments, the storage unit stores the UI update task corresponding to the status change that would not cause the update conflict into the current execution queue of a buffer pool; and stores, after having added a delayed update identifier to the UI update task corresponding to the status change that would cause the update conflict, the UI update task into the delayed execution queue of the buffer pool.

In some embodiments, the judgment unit judges that the corresponding status change would cause the update conflict in the case where at least one of the following conditions is met: the status change conflicting with a UI status information update caused by a user's UI interaction operation; and the number of devices with the status changes being greater than a threshold.

In some embodiments, the execution unit retrieves a UI update task corresponding to a latest status change in the delayed execution queue, and executes the UI update task as a target task; judges whether corresponding device and status types of other UI update tasks in the delayed execution queue are the same as that of the target task; removes the UI update task with the same corresponding device and status type as the target task from the delayed execution queue; and repeatedly executes the above steps until no UI update task remains in the delayed execution queue.

In some embodiments, the storage unit stores the status changes corresponding to the UI update tasks in the current execution queue and the delayed execution queue as historical status change information of the corresponding devices, for status information recalling of the at least one device.

In some embodiments, the storage unit creates a status aggregation class containing at least one device status class corresponding to the at least one device, the device status class containing a status list for storing the each status change and device operation corresponding to the each status change; and stores status change corresponding to each management UI update tasks in the current execution queue and the delayed execution queue, as the historical status change information of the device corresponding to the status change, in the status list corresponding to the device.

In some embodiments, the execution unit stores, after retrieving and executing a certain UI update task in the delayed execution queue, in response to a status change that would cause the update conflict during the execution of the UI update task, a UI update task corresponding to the status change into the delayed execution queue; and preferentially executes the UI update task corresponding to the status change.

In some embodiments, the status change is detected by at least one of the following: detecting the status change in response to a control apparatus sending a control command to the at least one device; detecting the status change in response to that the device is a sensor and at least one of a monitoring environment or a monitoring condition of the sensor changes; or detecting the status change in response to the control apparatus synchronizing the status information of the at least one device.

According to further embodiments of the present disclosure, there is provided a processing apparatus of device status change, comprising: a memory; and a processor coupled to the memory, the processor being configured to perform, based on instructions stored in the memory, the processing method of the device status change according to any of the above embodiments.

According to still further embodiments of the present disclosure, there is provided a non-transitory computer-readable storage medium having stored thereon a computer program which, when executed by a processor, implements the processing method of device status change according to any of the above embodiments.

Other features of the present disclosure and advantages thereof will become apparent from the following detailed description of exemplary embodiments thereof, which proceeds with reference to the accompanying drawings.

BRIEF DESCRIPTION OF THE DRAWINGS

The accompanying drawings described herein are used for providing a further understanding of the present disclosure, and constitute a part of this application, and illustrative embodiments of the present disclosure, together with their description, serve to explain the present disclosure and not to limit the present disclosure improperly. In the drawings.

DETAILED DESCRIPTION

Figure 1:
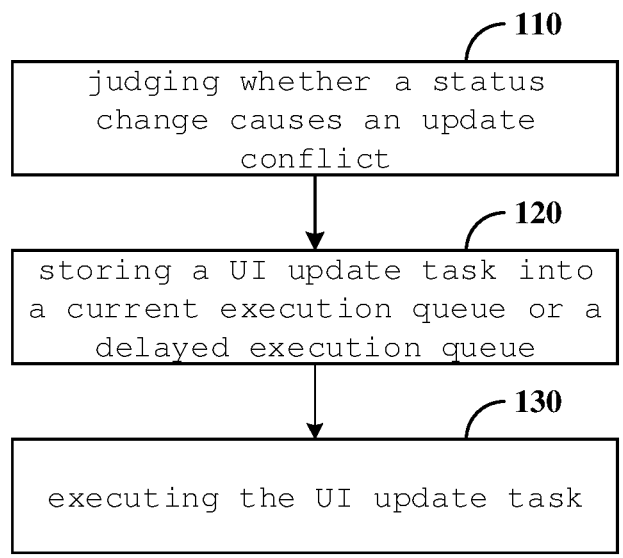
FIG. 1 illustrates a flow diagram of a processing method of device status change according to some embodiments of the present disclosure.

The technical solution in the embodiments of the present disclosure will be described clearly and completely with reference to the accompanying drawings in the embodiments of the present disclosure, and it is obvious that the embodiments described are only some of the embodiments of the present disclosure, rather than all of them. The following description of at least one exemplary embodiment is merely illustrative in nature and is in no way intended to limit this disclosure, its application, or uses. All other embodiments, which can be derived by those skilled in the art from the embodiments disclosed herein without making inventive efforts, are intended to be within the scope of the present disclosure.

Relative arrangements of components and steps, numerical expressions and numerical values set forth in these embodiments do not limit the scope of the present disclosure unless specifically stated otherwise. Meanwhile, it should be understood that sizes of parts shown in the drawings are not drawn to actual scales for ease of description. Techniques, methods, and devices known to one of ordinary skill in the related art may not be discussed in detail but are intended to be regarded as a part of the specification where appropriate. In all examples shown and discussed herein, any specific value should be construed as exemplary only instead of restrictive. Thus, other examples of the exemplary embodiments can have different values. It should be noted that: similar reference numbers and letters denote similar items in the following drawings, and thus, once an item is defined in one drawing, it need not be discussed further in subsequent drawings.

Inventors of the present disclosure have found that there is the following problem in the above related art: the detected status change may cause a UI update conflict, resulting in an inaccurate device status update in a UI interface. In view of this, the present disclosure provides a technical solution of processing device status change.

FIG. 1 illustrates a flow diagram of a processing method of device status change according to some embodiments of the present disclosure.

As shown in FIG. 1, the method which is executed by an electronic device, comprises: step 110, judging whether a status change causes an update conflict; step 120, storing a UI update task into a current execution queue or a delayed execution queue; and step 130, executing the UI update task.

In the step 110, in response to detecting one or more status changes of at least one device, judging whether each status change would cause an update conflict of status information corresponding the each status change, in a management user interface of the at least one device. For example, the devices can be various smart home devices in a whole-house intelligent control system, such as lamps, air conditioners, and the like, and their status can be on, off, set brightness, set temperature, and the like. A user can control and monitor the statuses of the devices through a control UI on a terminal.

In some embodiments, the status change is detected in response to a control apparatus sending a control command to the devices. For example, the control apparatus of the whole-house intelligent control system can send various active-control commands to control the status changes of the smart home devices. In this case, the status change can be detected by a status change feedback result returned by a controlled apparatus. For example, the control apparatus can control the lamp and air conditioner in a room to be turned on or off, and the lamp and air conditioner can return, after the execution of the control command, their status changes which are off or on.

In some embodiments, the status change is detected in response to that the device is a sensor and at least one of a monitoring environment or a monitoring condition of the sensor changes. For example, the smart home devices can be sensors such as a thermometer, a light sensor, a voice control apparatus. In the case where the monitoring environment and monitoring condition, such as temperature, brightness, and sound, detected by these sensors, change, status changes of these sensors would occur.

In some embodiments, the status change is detected in response to the control apparatus synchronizing the status information of the devices. For example, the whole-house intelligent control system can be provided with a plurality of control panels within its control space, for controlling and monitoring a same batch of smart home devices. When the control panels synchronize their controlled smart home devices, the status changes of the devices can be acquired.

In some embodiments, initial data collection and classification is performed. For example, different information collection modules (status change detection modules) can be provided for acquiring data relating to the status changes of the devices under different conditions. In this way, the acquired data can be classified according to the device to which the data belong, that is, a data set of each device is generated; and a status set of each device is generated by extracting the data relating to the status from the data set.

In some embodiments, it is judged that the corresponding status change would cause the update conflict in the case where at least one of the following conditions is met: the status change conflicting with a UI status information update caused by a user's UI interaction operation; and the number of devices with the status changes being greater than a threshold.

For example, the number of devices with the status changes being greater than a threshold would cause a large number of UI update tasks, which lead to UI update operations contending for resources, and cause UI update confusions, slowed UI responses, and so on.

For example, a first user turns off a lamp of a hall through the control UI on the terminal, and a second user turns on the lamp of the hall through a switch provided in the hall within a same time period. In this case, an update conflict occurs between a status change caused by the second user and a status change in the UI caused by the first user.

For example, multiple devices have updated their statuses within a same time period, which would causes a large number of status updates in the control UI, thereby resulting in delayed and slowed UI responses, i.e., update conflicts occur.

In the step 120, the UI update task corresponding to the status change that would not cause the update conflict is stored in the current execution queue, and the UI update task corresponding to the status change that would cause the update conflict is stored in the delayed execution queue.

In some embodiments, it is judged whether UI status data update rendering corresponding to the status change is in conflict (update conflict) with the current UI interaction. If it is in conflict with the current UI interaction, a delayed update identifier is added to the UI update task with this status change, and the UI update task is inserted into the delayed execution queue of a buffer pool; and if it is not in conflict with the current UI interaction, the status buffer pool is directly notified of updating the current execution queue. The delayed update identifier can also be acquired according to an interaction logic.

For example, an intelligent lamp is provided with an optical sensor. In response to the optical sensor detecting dim ambient light, the intelligent lamp increases the brightness, i.e., a status change occurs; the user controls, through the UI, decreasing the brightness of the intelligent lamp within a same time period; in this case, the corresponding UI update of the status change is in conflict with the current UI interaction, and the UI update task is inserted into the delayed execution queue of the buffer pool.

For example, the smart home device is provided with a plurality of control apparatuses, such as control panels respectively provided in different rooms. In order to ensure consistent status of the device, status information of these control panels will be synchronized regularly. For example, a color temperature index of an intelligent lamp in a control panel A is 10, a set temperature of an air conditioner in a control panel B is 25°; when status information of the control panel A and the control panel B is synchronized, the corresponding status information of the intelligent lamp and the air conditioner will change. In this case, it is necessary to judge whether the corresponding UI status data update rendering of the status change is in conflict with the current UI interaction.

For example, the smart home devices are provided with a unified control apparatus, such as a central controller, as a control center. The central controller can control the smart home devices and cause status changes thereof. For example, in response to coming to a preset rest time, the central controller can send a control instruction to each lighting device to decrease the brightness; in this case, it is necessary to judge whether the corresponding UI status data update rendering of the status change is in conflict with the current UI interaction.

In the step 130, in the case where the update conflict corresponding to the UI update task in the delayed execution queue has ended, the UI update task in the delayed execution queue is executed. For example, the UI update task in the delayed execution queue can be executed after the UI update task in the current execution queue has been executed.

In some embodiments, it can be judged whether a delayed update of the UI is needed by determining whether the UI update task has the delayed update identifier.

For example, in the case where the delayed update of the UI is needed, in the case where a UI logic monitoring is started, it is monitored whether a UI interaction behavior logic conflict (update conflict) has ended. The UI logic monitoring, in the case where it receives a confirm refresh notification (i.e., the update conflict has ended), notifies the buffer pool of updating the UI.

In some embodiments, in the case where the delayed update of the UI is needed, it can be further detected whether the UI update task needs to carry a data module data update identifier, so as to determine whether to perform the UI update. For example, the buffer pool can perform different operations according to the data update identifier.

In some embodiments, when the delayed update of the UI is needed, it is monitored whether the update conflict has ended; when it is judged that the conflict has ended and the UI update task can be executed, the data module data update identifier is added to the update task. That is, when the delayed update task can be refreshed at the end of the conflict, the data module data update identifier is added. The buffer pool, when detecting the data update identifier, notifies a data update module of updating the data.

Since a historical status aggregation data set can be generated directly through status aggregation when the delayed task update is not needed, the addition of the data update identifier is not needed. For example, the buffer pool can judge whether the UI update task carries the data update identifier. If the data update identifier is not carried, the process is directly ended, and a next operation is not performed; and if the buffer pool judges that the data update identifier is carried, it notifies the data update module of updating the data (executing the UI update task). After the data update module sends out a data update request, the data relating to the status of the device is acquired through active APIs (Application Programming Interface) of different information collection modules, and the above steps 110 to 130 are repeated.

In some embodiments, in the case where the delayed update of the UI is not needed, the historical status aggregation data set is generated by status aggregation. For example, the status changes corresponding to the UI update tasks in the current execution queue and the delayed execution queue are stored as historical status change information of the device corresponding to the status change, for status information recalling of the devices.

For example, an status aggregation class can be created, which contains a plurality of device status classes corresponding to the devices. The device status class can contain a status list for storing the status changes and their corresponding device operations. The status changes corresponding to the UI update tasks in the current execution queue and the delayed execution queue are stored, as the historical status change information of the device corresponding to the status change, in the corresponding status lists.

In some embodiments, after the historical status aggregation data set is generated, the buffer pool sends a notification of updating the UI, and acquires buffer data from the current execution queue to refresh and render the UI.

In some embodiments, after a certain UI update task in the delayed execution queue has been retrieved and executed, in response to a status change that would cause the update conflict during the execution of the UI update task, a UI update task corresponding to the status change is stored into the delayed execution queue; and the UI update task corresponding to the status change is preferentially executed.

For example, during the execution of a UI update task in the delayed execution queue, a status change conflicting with a user's UI interaction operation occurs. In this case, a corresponding UI update task of the status change can be stored into a top position in the delayed execution queue; and after the UI update task has been executed, other UI update tasks in the delayed execution queue with the same device and status as the UI update task can be removed. In this way, repeated updates of the same status of the same device can be avoided, thereby improving efficiency and accuracy of the UI update.

In the above embodiment, by setting the delayed execution queue, the execution of the UI update task that would cause the update conflict would be delayed, which avoids a UI status update error caused by the update conflict. In this way, the efficiency and accuracy of the status update can be improved.

Figure 2:
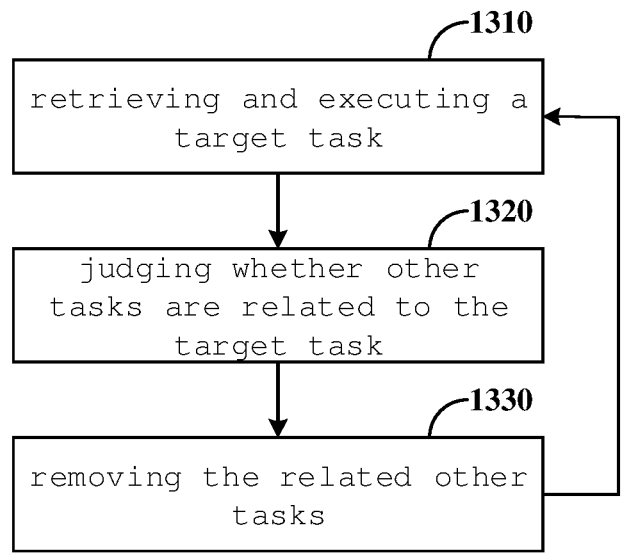
FIG. 2 illustrates a flow diagram of step 130 in FIG. 1 according to further embodiments.

In some embodiments, the UI update tasks in the delayed queue can be executed through the steps in FIG. 2.

FIG. 2 illustrates a flow diagram of step 130 in FIG. 1 according to further embodiments.

As shown in FIG. 2, the step 130 comprises: step 1310, retrieving and executing a target task; step 1320, judging whether there are other tasks related to the target task; and step 1330, removing the related other tasks.

In the step 1310, a UI update task corresponding to a latest status change in the delayed execution queue is retrieved and executed as the target task. For example, the corresponding UI update tasks can be stored in the delayed execution queue in chronological order of the status changes; and then, the UI update tasks are retrieved from the delayed queue for execution in first-in last-out order.

In the step 1320, it is judged whether corresponding device and status types of other UI update tasks in the delayed execution queue are the same as that of the target task.

In the step 1330, the UI update task with the same corresponding device and status type as the target task is removed from the delayed execution queue. The steps 1310-1330 are repeated until no UI update task remains in the delayed execution queue.

For example, the UI update task retrieved in the step 1310 is to update the status of the lamp to an off status, and there is another UI update task in the delayed execution queue which is to update the status of the lamp to the off status. Since the status change time corresponding to the other UI update task is earlier than the status change time corresponding to the UI update task having been executed, the other UI update task is cancelled. In this way, the repeated update of the same status of the same device can be avoided, thereby improving the efficiency and accuracy of the UI update.

In some embodiments, the above steps can be executed in a unified manner by a status management center (provided with the processing apparatus of device status change) of the whole-house intelligent control system. Therefore, in view of the problems of difficult status synchronization, non-real-time status updates, asynchronous status updates of distributed control panels, difficult aggregation of dispersed status information, etc., in the scene of the whole-house intelligent control system, the device statuses can be managed in a unified manner by the status management center.

For example, the status management center acquires data sets of the devices through different channels, and performs status extraction on the data set to form a status data set; judge whether there is a status change according to the data in the status data set, and send a corresponding UI update task of the status change to the status buffer pool; the UI update task can be allocated to the delayed execution queue or the current execution queue according to whether the UI update task buffered in the status buffer pool carries the delayed update identifier.

For example, the status management center can further aggregate the status changes according to the status type (related devices of the status), and generate a historical status data set, for providing historical data of the status and an aggregation application of the status information.

In this way, a status management center module with high availability and strong real-time performance is formed through a status data center. The status management center can buffer and aggregate the status, and also supports delayed loading of the updated data.

Figure 3:
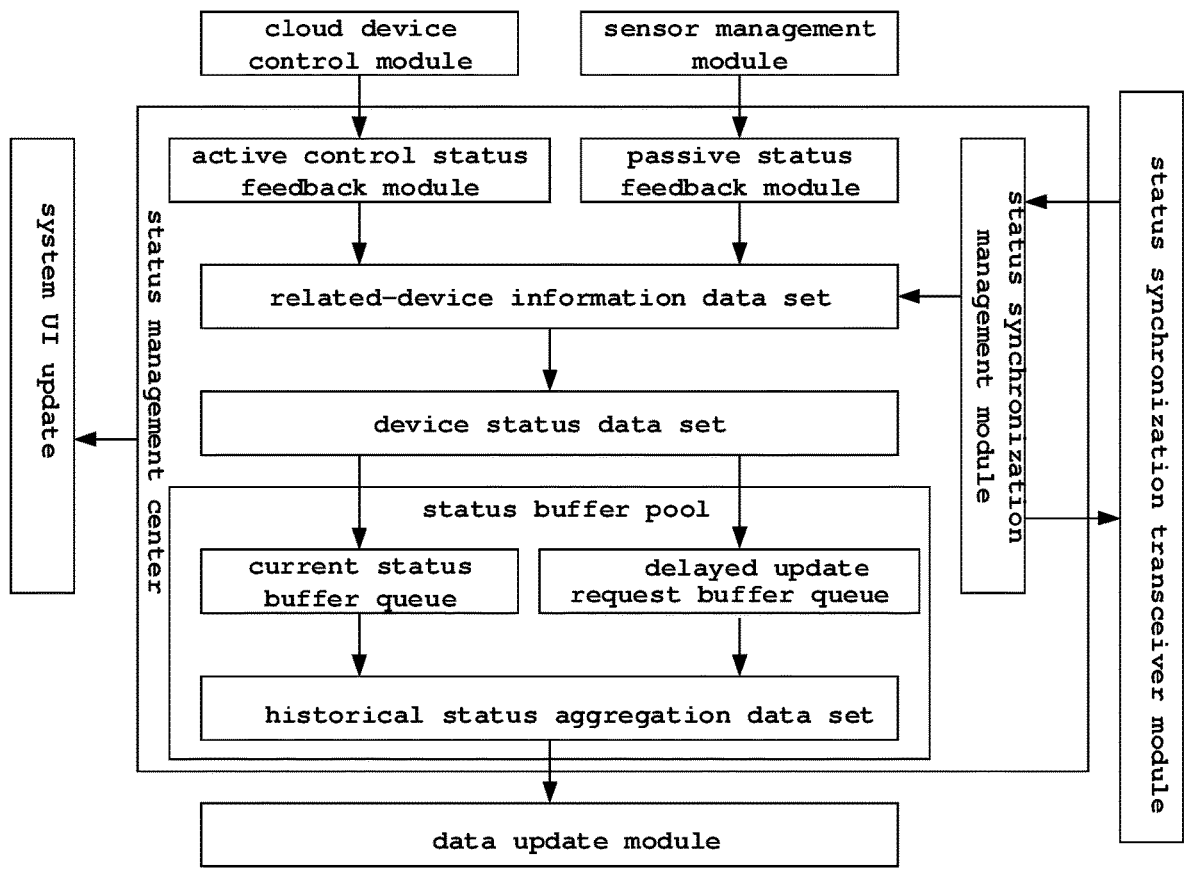
FIG. 3 illustrates a schematic diagram of a processing apparatus of device status change according to some embodiments of the present disclosure.

FIG. 3 illustrates a schematic diagram of a processing apparatus of device status change according to some embodiments of the present disclosure.

As shown in FIG. 3, the status management center (processing apparatus of device status change) can collect the status information of the devices in the whole-house intelligent control system through 3 different channels.

For example, after a device control command is sent to cloud through a Cloud Presenter (cloud device control module), a device status change feedback result can be received after the control command returned by a controlled apparatus has been executed.

For example, when the device is a sensor-type device, a status change feedback of the sensor-type device can be passively received through a sensor management module in the case where an environment or condition monitored by the sensor changes.

For example, in the whole-house intelligent control system, the status of the devices are monitored through the distributed control panels. Moreover, each control panel shares the status information of each device through data synchronization. For example, different rooms are provided with different control panels, one control panel causes status change of the devices, and other control panels synchronize the status change. In this case, status synchronization information generated when a certain control panel is used can be received through a status synchronization transceiver module, and the synchronized status change is acquired according to the status synchronization information.

In some embodiments, the status management center stores, via different information transmission channels, the data information of the status changes, which is acquired through the 3 different channels, into the status changes related-device information data set. The device status data set is extracted from the device information data set.

For example, the status management center stores, via data analysis and transmission channels (an active control status feedback module, a passive status feedback module, and a status synchronization management module), the device change feedback results (e.g., success and failure), and information Json data (e.g., which statuses of which devices have changed), etc., which are individually acquired through a cloud device control module, a sensor management module, and a status synchronization management module, into the related-device information data set. The status management center performs status extraction (extracts data related to the status changes) on the related-device information data set, to obtain the related-device status data set.

In some embodiments, when the device status data set changes, the status management center triggers a status buffering mechanism of the status buffer pool. For example, the status management center stores a corresponding UI update task of a changed status data set into the current execution queue in the status buffer pool.

In some embodiments, in the device status data set, a device status class can be created for each device, for storing status information of each device at each moment. After the current execution queue has been updated, the status information in the status aggregation class can be updated by means of status aggregation. The status aggregation class can be inserted into the historical status aggregation data set.

For example, before the status aggregation class is inserted into the historical status aggregation data set, a size of the historical status aggregation data set can be judged. If the size exceeds a preset MAXSIZE (preset maximum value), earliest aggregation data (status information) is removed from the queue in a first-in first-out manner, and the latest aggregation data is inserted.

In some embodiments, a model class can be created as the status aggregation class (Status Aggregation Model). In the status aggregation class, one list of device status classes (Status Model classes) is maintained for storing the device status classes of the devices. In each device status class, one status list (Action Model class) of a current status of a corresponding device, a corresponding device ID and category are maintained.

For example, several common attributes can be set in the Action Model class. The common attributes can comprise: actionType for storing types of a current device status (e.g., brightness, color temperature and the like of a lamp); and actionValue for storing status values (e.g., brightness value, whether to be turned on, whether to be turned off, etc.) of a current device status, wherein the type can be Object. In this way, the device status information in the current execution queue of the buffer pool can be converted into a unified status aggregation class.

For example, the Status Model corresponding to each device generated in the previous step can be inserted into the list of Status Model classes which is maintained in the status aggregation class one by one.

For example, a queue of historical status aggregation data (Status Aggregation Model class) can be maintained in the status buffer pool. An instance of the Status aggregation Model class, which is generated by this update, can also be inserted into this queue. The queue can be provided with its maximum holding value (MAXSIZE) in the buffer pool, and before insertion, it can be detected whether the length of the queue exceeds a limit; and if so, a removal operation of the end of the queue can be carried out, and then the insertion operation is carried out.

In some embodiments, it can be detected whether the delayed update identifier is carried when a status change is triggered. In the case where the delayed update identifier is carried, a delayed update mechanism of the status management center is triggered. For example, a waiting request thread can be started, and a corresponding UI update task is added into the delayed execution queue; a preset waiting time (WAITING_TIME) is loaded; if a thread cancellation operation is not triggered within the waiting time, after the waiting time is over, a notification of delayed update is sent to an outer layer, so as to delay the execution of the corresponding UI update task.

In some embodiments, before the waiting request thread is started, the update of the current execution queue can be performed (i.e. a new task is added into the current execution queue); and after the current execution queue is updated, callback of the notification of status data synchronization is performed. For example, by means of interface callback of an upper layer, the UI update of the currently buffered status data is performed first, so that the status consistency can be ensured.

In some embodiments, after the corresponding UI update of the delayed execution queue is performed, before the waiting thread is ended, it can be queried whether there are still any requests for the delayed update in the delayed execution queue. If there is a request for the delayed update, a notification of data update can be sent to the outer layer data update module; the data update module performs data update in the background and performs system UI update; and the updated data can be, through the cloud channel, sent to the status management center again.

When the updated data reaches the buffer pool, it can be compared with the current execution queue in the current buffer pool. If the data changes (showing that the device status changes again during the data update), the above status aggregation and UI update flows are triggered; if the data do not change, the buffer pool update flow is not triggered.

In this way, through the delayed update mechanism, the problems of the accuracy and consistency of simultaneous operation status synchronization in the plurality of scene panels are solved. Moreover, the delayed update mechanism can also avoid frequent interface refreshing and UI rendering caused by too much status synchronization information, which improves the real-time performance and the availability.

Figure 4:
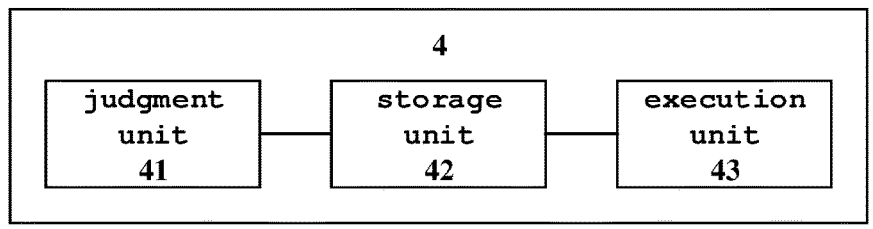
FIG. 4 illustrates a block diagram of a processing apparatus of device status change according to some embodiments of the present disclosure.

FIG. 4 illustrates a block diagram of a processing apparatus of device status change according to some embodiments of the present disclosure.

As shown in FIG. 4, the processing apparatus 4 of device status change comprises a judgment unit 41, a storage unit 42, and an execution unit 43.

The judgment unit 41 judges, in response to detecting status changes of devices, whether each status change would cause an update conflict of status information corresponding to the each status change in a management UI of each device. The storage unit 42 stores a UI update task corresponding to a status change that would not cause the update conflict into a current execution queue; and stores a UI update task corresponding to a status change that would cause the update conflict into a delayed execution queue. The execution unit 43 executes, after having executed the UI update task in the current execution queue, the UI update task in the delayed execution queue in the case where the update conflict corresponding to the UI update task in the delayed execution queue has ended.

Figure 5:
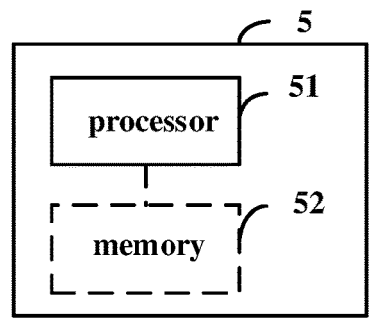
FIG. 5 illustrates a block diagram of a processing apparatus of device status change according to other embodiments of the present disclosure.

FIG. 5 illustrates a block diagram of a processing apparatus of device status change according to other embodiments of the present disclosure.

As shown in FIG. 5, the processing apparatus 5 of device status change comprises one or more processors 51. The processor 51 is configured to: judge, in response to detecting status changes of devices, whether each status change would cause an update conflict of status information corresponding to the each status change, in a management UI of each device; store a UI update task corresponding to a status change that would not cause the update conflict into a current execution queue, and store a UI update task corresponding to a status change that would cause the update conflict into a delayed execution queue; and execute, after having executing the UI update task in the current execution queue, the UI update task in the delayed execution queue in the case where the update conflict corresponding to the UI update task in the delayed execution queue has ended.

In some embodiments, the processor 51 judges that the status change would cause the update conflict if at least one of the following conditions is met: the status change conflicting with a UI status information update caused by a user's UI interaction operation; and the number of devices with the status changes being greater than a threshold.

In some embodiments, the processor 51 retrieves a UI update task corresponding to a latest status change in the delayed execution queue, and executes the UI update task as a target task; judges whether corresponding device and status types of other UI update tasks in the delayed execution queue are the same as that of the target task; removes the UI update task with the same corresponding device and status type as the target task from the delayed execution queue; and repeatedly executes the above steps until no UI update task remains in the delayed execution queue.

In some embodiments, the processor 51 is further configured to: store the status changes corresponding to the UI update tasks in the current execution queue and the delayed execution queue as historical status change information of the device corresponding to the status change. The processing apparatus 5 of device status change further comprises a memory 52 for storing the historical status change information.

In some embodiments, the processor 51 creates an status aggregation class containing a plurality of device status classes corresponding to the devices, the device status class containing a status list for storing the status changes and their corresponding device operations; and stores the status changes corresponding to the UI update tasks in the current execution queue and the delayed execution queue, as the historical status change information of the device corresponding to the status change, in the corresponding status lists.

In some embodiments, the processor 51 stores, after retrieving and executing a certain UI update task in the delayed execution queue, in response to a status change that would cause the update conflict during the execution of the UI update task, a UI update task corresponding to the status change into the delayed execution queue; and preferentially executes the UI update task corresponding to the status change.

In some embodiments, the status change is detected by at least one of the following: detecting the status change in response to a control command sent by the control apparatus to the devices; detecting the status change in response to that the device is a sensor and at least one of a monitoring environment or monitoring condition of the sensor changes; or detecting the status change in response to the control apparatus synchronizing the status information of the devices.

In some embodiments, the processing apparatus 5 of device status change comprises: a memory 51 and a processor 52 coupled to the memory 51, the processor 52 being configured to execute, based on instructions stored in the memory 51, the processing method of device status change in any embodiment of the present disclosure.

The memory 51 can comprise, for example, a system memory, a fixed non-volatile storage medium, and the like. The system memory has stored thereon, for example, an operating system, an application program, a Boot Loader, a database, and other programs.

Figure 6:
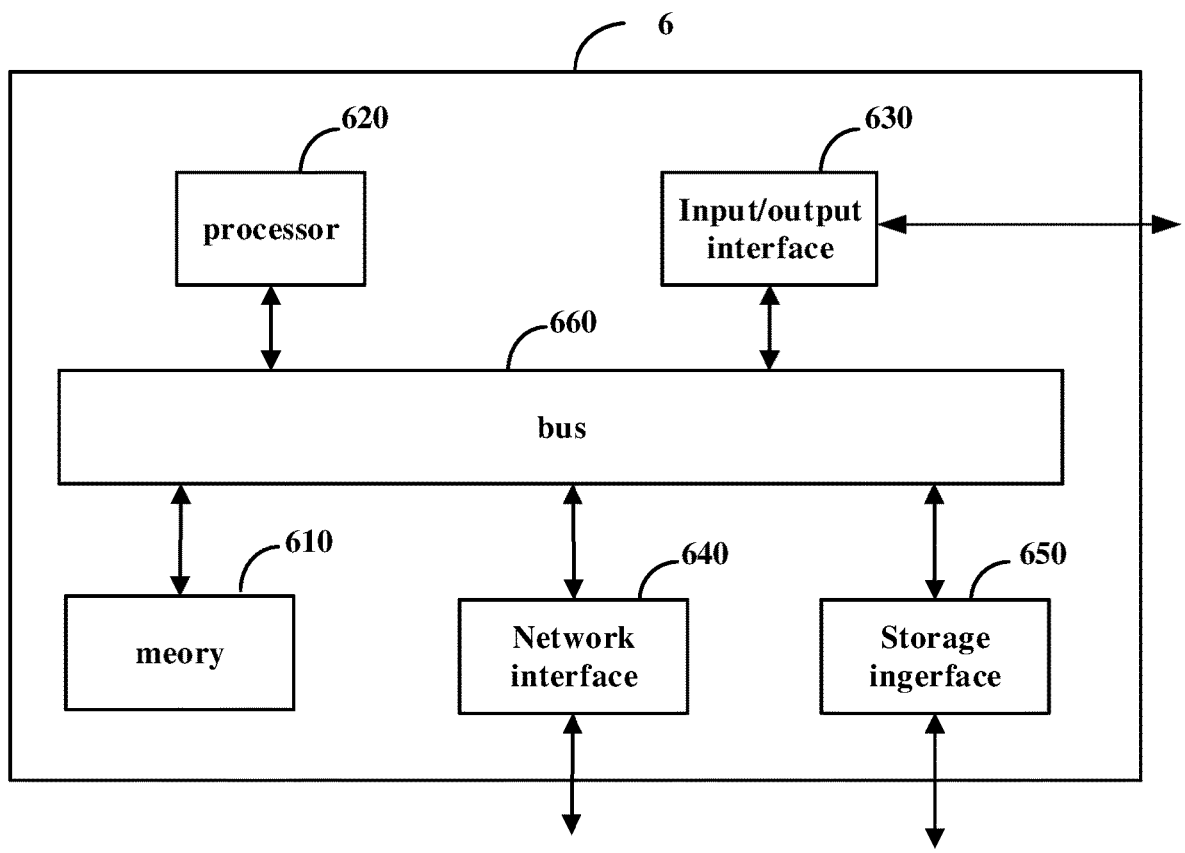
FIG. 6 illustrates a block diagram of a processing apparatus of device status change according to still other embodiments of the present disclosure.

FIG. 6 illustrates a block diagram of a processing apparatus of a device status change according to still other embodiments of the present disclosure.

As shown in FIG. 6, the processing apparatus 6 of device status change in this embodiment can be represented in the form of a general-purpose computing device. The computer system comprises a memory 610, a processor 620, and a bus 660 that connect various system components.

The memory 610 can comprise, for example, a system memory, a non-volatile storage medium, and the like. The system memory has thereon stored, for example, an operating system, an application program, a Boot Loader (Boot Loader), and other programs. The system memory can comprise a volatile storage medium, such as a Random Access Memory (RAM) and/or a cache memory. The non-volatile storage medium has stored thereon, for example, instructions to perform a corresponding embodiment of the shown method. The non-volatile storage medium comprises, but is not limited to, a magnetic disk memory, optical memory, flash memory, and the like.

The processor 620 can be implemented as a discrete hardware component, such as a general-purpose processor, Digital Signal Processors (DSP), Application Specific Integrated Circuits (ASIC), Field Programmable Gate Arrays (FPGA) or other programmable logic device, discrete gate or transistor, etc. Correspondingly, each of the modules, such as the judgment module and the determination module, can be implemented by a Central Processing Unit (CPU) executing instructions in a memory to perform the corresponding steps, or can be implemented by a dedicated circuit to perform the corresponding steps.

The bus 660 can employ any of a variety of bus architectures. For example, the bus architectures comprise, but are not limited to, an Industry Standard Architecture (ISA) bus, Micro Channel Architecture (MCA) bus, and Peripheral Component Interconnect (PCI) bus.

The computer system can further comprise an input/output interface 630, a network interface 640, a storage interface 650, and the like. These interfaces 630, 640, 650, as well as the memory 610 and the processor 620 can be connected via the bus 660. The input/output interface 630 can provide connection interfaces for an input/output device such as a display, a mouse, and a keyboard. The network interface 640 provides connection interfaces for a variety of networking devices. The storage interface 640 provides connection interfaces for external storage devices such as a floppy disk, a U disk, and an SD card.

As will be appreciated by one of skill in the art, the embodiments of the present disclosure can be provided as a method, system, or computer program product. Accordingly, the present disclosure can take the form of an entire hardware embodiment, an entire software embodiment or an embodiment combining software and hardware aspects. Furthermore, the present disclosure can take the form of a computer program product implemented on one or more computer-usable non-transitory storage media (comprising, but not limited to, a disk memory, CD-ROM, optical memory, and so forth) having computer-usable program codes embodied therein.

So far, the processing method and processing apparatus of device status change, and the non-transitory computer-readable storage medium according to the present disclosure have been described in detail. Some details well known in the art have not been described in order to avoid obscuring the concepts of the present disclosure. Those skilled in the art can now fully appreciate how to implement the solutions disclosed herein, in view of the foregoing description.

The disclosed method and system can be implemented in a number of ways. For example, the disclosed method and system can be implemented in software, hardware, firmware, or any of their combinations. The above order for the steps of the method is for illustration only, and the steps of the disclosed method are not limited to the order specifically described above unless specifically stated otherwise. Furthermore, in some embodiments, the present disclosure can also be implemented as programs recorded in a recording medium, these programs comprising machine-readable instructions for implementing the methods according to the present disclosure. Thus, the present disclosure also covers the recording medium having stored thereon the programs for executing the methods according to the present disclosure.

Although some specific embodiments of the present disclosure have been described in detail through examples, it should be understood by those skilled in the art that the above examples are for illustration only and are not intended to limit the scope of the present disclosure. It will be appreciated by those skilled in the art that modifications can be made to the above embodiments without departing from the scope and spirit of the present disclosure. The scope of the present disclosure is defined by the attached claims.

What is claimed is:

1. A processing method of device status change, which is executed by a processor, comprising:
in response to detecting one or more status changes of at least one device, judging whether each status change would cause an update conflict of status information corresponding to the each status change in a management user interface of the at least one device;
storing a management user interface update task corresponding to a status change that would not cause the update conflict into a current execution queue, and storing a management user interface update task corresponding to a status change that would cause the update conflict into a delayed execution queue; and
in the case where the update conflict corresponding to the management user interface update task in the delayed execution queue has ended, executing the management user interface update task corresponding to the update conflict in the delayed execution queue.

2. The processing method according to claim 1, wherein the executing the management user interface update task corresponding to the update conflict in the delayed execution queue comprises:
  executing the management user interface update task in the delayed execution queue, after the management user interface update task in the current execution queue has been executed.

3. The processing method according to claim 1, wherein the judging whether each status change would cause an update conflict of status information corresponding to the each status change, in a management user interface of the at least one device comprises:
  determining the status change would cause the update conflict in the case where at least one of following conditions is met:
  an update of status information caused by a status change conflicting with an update of status information caused by an interaction operation received by the management user interface; or
  the number of devices with status change being greater than a threshold.

4. The processing method according to claim 1, wherein the executing the management user interface update task corresponding to the update conflict in the delayed execution queue comprises:
  retrieving a management user interface update task corresponding to a latest status change in the delayed execution queue, and executing it as a target task;
  judging whether device and status type corresponding to other management user interface update task in the delayed execution queue are the same as device and status type corresponding to the target task;
  removing a management user interface update task with the same device and status type as the target task from the delayed execution queue; and
  repeatedly executing above steps until no management user interface update task remains in the delayed execution queue.

5. The processing method according to claim 1, further comprising:
  storing a status change corresponding to the management user interface update tasks in the current execution queue and the delayed execution queue as historical status change information of a device corresponding to the status change, for status information recalling.

6. The processing method according to claim 5, wherein the storing a status change corresponding to the management user interface update tasks in the current execution queue and the delayed execution queue as historical status change information of device corresponding to the status change comprises:
  creating a status aggregation class containing at least one device status class corresponding to the at least one device, the device status class containing a status list for storing the each status change and device operation corresponding to the each status change; and
  storing status change corresponding to each management user interface update task in the current execution queue and the delayed execution queue, as the historical status change information of the device corresponding to the status change, in the status list corresponding to the device.

7. The processing method according to claim 1, wherein the executing the management user interface update task corresponding to the update conflict in the delayed execution queue comprises:
  after a certain management user interface update task in the delayed execution queue has been retrieved and executed, in response to a status change that would cause the update conflict during the execution of the management user interface update task, storing the management user interface update task corresponding to the status change into the delayed execution queue; and
  preferentially executing the management user interface update task corresponding to the new status change.

8. The processing method according to claim 1, wherein the status change is detected by at least one of the following:
  detecting the status change in response to a control apparatus sending a control command to the device;
  detecting the status change in response to at least one of a monitoring environment or monitoring condition of the device changing, the device being a sensor; or
  detecting the status change in response to the control apparatus synchronizing the status information of the device.

9. The processing method according to claim 1, wherein the storing a management user interface update task corresponding to a status change that would not cause the update conflict into a current execution queue, and storing a management user interface update task corresponding to a status change that would cause the update conflict into a delayed execution queue comprises:
  storing the management user interface update task corresponding to the status change that would not cause the update conflict into the current execution queue of a buffer pool; and
  storing the management user interface update task corresponding to the status change that would cause the update conflict into the delayed execution queue of the buffer pool.

10. The processing method according to claim 1, wherein the executing the management user interface update task corresponding to the update conflict in the delayed execution queue comprises:
  in the case where the update conflict corresponding to the management user interface update task in the delayed execution queue has ended, adding a data update identifier to the management user interface update task corresponding to the update conflict in the delayed execution queue; and
  sending a data update request according to the data update identifier, to update status of the device corresponding to the management user interface update task corresponding to the update conflict, and executing the management user interface update task corresponding to the update conflict.

11. A processing apparatus of device status change, comprising one or more processors configured to:
  in response to detecting one or more status changes of at least one device, judge whether each status change would cause an update conflict of status information corresponding to the each status change, in a management user interface of the at least one device;
  store a management user interface update task corresponding to a status change that would not cause the update conflict into a current execution queue, and store a management user interface update task corresponding to a status change that would cause the update conflict into a delayed execution queue; and
  in the case where the update conflict corresponding to the management user interface update task in the delayed execution queue has ended, execute the management user interface update task corresponding to the update conflict in the delayed execution queue.

12. The processing apparatus according to claim 11, wherein the executing the management user interface update task in the delayed execution queue comprises:
executing the management user interface update task in the delayed execution queue after the management user interface update task in the current execution queue has been executed.

13. The processing apparatus according to claim 11, wherein the judge whether each status change would cause an update conflict of status information corresponding to the each status change, in a management user interface of the at least one device comprises:
determining the status change would cause the update conflict in the case where at least one of following conditions is met:
an update of status information caused by a status change conflicting with an update of status information caused by an interaction operation received by the management user interface; or
the number of devices with status change being greater than a threshold.

14. The processing apparatus according to claim 11, wherein the executing the management user interface update task in the delayed execution queue comprises:
retrieving a management user interface update task corresponding to a latest status change in the delayed execution queue, and executing it as a target task;
judging whether device and status type corresponding to other management user interface update task in the delayed execution queue are the same as device and status type corresponding to the target task;
removing a management user interface update task with the same device and status type as the target task from the delayed execution queue; and
repeatedly executing above steps until no management user interface update task remains in the delayed execution queue.

15. The processing apparatus according to claim 11, wherein the processor is further configured to:
store a status change corresponding to the management user interface update tasks in the current execution queue and the delayed execution queue as historical status change information of a device corresponding to the status change, for status information recalling.

16. The processing apparatus according to claim 15, wherein the storing a status change corresponding to the management user interface update tasks in the current execution queue and the delayed execution queue as historical status change information of device corresponding to the status change comprises:
creating a status aggregation class containing at least one device status class corresponding to the at least one device, the device status class containing a status list for storing the each status change and device operation corresponding to the each status change; and
storing status change corresponding to each management user interface update task in the current execution queue and the delayed execution queue, as the historical status change information of the device corresponding to the status change, in the status list corresponding to the device.

17. The processing apparatus according to claim 11, wherein the executing the management user interface update task in the delayed execution queue comprises:
after a certain management user interface update task in the delayed execution queue has been retrieved and executed, in response to a status change that would cause the update conflict during the execution of the management user interface update task, storing a management user interface update task corresponding to the status change into the delayed execution queue; and
preferentially executing the management user interface update task corresponding to the new status change.

18. The processing apparatus according to claim 11, wherein the status change is detected by at least one of the following:
detecting the status change in response to a control apparatus sending a control command to the device;
detecting the status change in response to at least one of a monitoring environment or monitoring condition of the device changing, the device being a sensor; or
detecting the status change in response to the control apparatus synchronizing the status information of the device.

19. A non-transitory computer-readable storage medium having computer program instructions stored thereon that, when executed by at least one processor, cause the at least one processor to:
detect one or more status changes of at least one device;
in response to detecting one or more status changes of at least one device, judge whether each status change would cause an update conflict of status information corresponding to the each status change in a management user interface of the at least one device;
store a management user interface update task corresponding to a status change that would not cause the update conflict into a current execution queue, and storing a management user interface update task corresponding to a status change that would cause the update conflict into a delayed execution queue; and
execute the management user interface update task corresponding to the update conflict in the delayed execution queue in the case where the update conflict corresponding to the management user interface update task in the delayed execution queue has ended.

* * * * *